(12) United States Patent
Heo et al.

(10) Patent No.: US 9,038,772 B2
(45) Date of Patent: May 26, 2015

(54) HYBRID SILENCER WITH GAS-LIQUID SEPARATING FUNCTION IN FUEL CELL SYSTEM

(71) Applicant: SAMSUNG SDI CO., LTD., Yongin-si, Gyeonggi-do (KR)

(72) Inventors: Jin-suck Heo, Hwaseong-si (KR); Won-ho Lee, Suwon-si (KR); Hye-jung Cho, Anyang-si (KR); Jong-rock Choi, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/664,896

(22) Filed: Oct. 31, 2012

(65) Prior Publication Data

US 2013/0175114 A1 Jul. 11, 2013

(30) Foreign Application Priority Data

Jan. 11, 2012 (KR) .......................... 10-2012-0003445

(51) Int. Cl.
| | |
|---|---|
| *F16K 47/00* | (2006.01) |
| *F16L 58/02* | (2006.01) |
| *F01N 1/02* | (2006.01) |
| *F01N 1/08* | (2006.01) |
| *F01N 1/24* | (2006.01) |
| *H01M 8/04* | (2006.01) |
| *F01N 3/00* | (2006.01) |

(52) U.S. Cl.
CPC ........... *F01N 1/089* (2013.01); *H01M 2250/20* (2013.01); *Y02T 10/20* (2013.01); *F01N 3/005* (2013.01); *Y02E 60/50* (2013.01)

(58) Field of Classification Search
CPC ......... Y02E 60/50; Y02T 10/20; F01N 3/005; F01N 1/089; H01M 2250/20
USPC ................... 181/233, 272, 258, 249; 429/428
See application file for complete search history.

(56) References Cited

U.S. PATENT DOCUMENTS

| | | | | |
|---|---|---|---|---|
| 2,498,979 | A | * | 2/1950 | Bourne .......................... 181/260 |
| 5,200,278 | A | * | 4/1993 | Watkins et al. ................ 429/413 |

(Continued)

FOREIGN PATENT DOCUMENTS

| | | |
|---|---|---|
| DE | 10330500 A1 | 1/2005 |
| EP | 1106295 A2 | 6/2001 |

(Continued)

OTHER PUBLICATIONS

Extended European Search Report for Application No. 12188886.1-1360 dated May 31, 2013.

(Continued)

*Primary Examiner* — Elvin G Enad
*Assistant Examiner* — Christina Schreiber
(74) *Attorney, Agent, or Firm* — Christie, Parker & Hale, LLP

(57) ABSTRACT

A hybrid silencer in a fuel cell system includes an expansion chamber connected to a predetermined apparatus of the fuel cell system, where the expansion chamber reduces acoustic noise of a fluid discharged from the predetermined apparatus, a water-absorber disposed inside the expansion chamber, where the water-absorber absorbs a liquid component of a fluid which flows into the expansion chamber; and a perforated silencer which discharges the fluid from which the liquid component is removed by the water-absorber while reducing acoustic noise of the fluid discharged therefrom.

16 Claims, 8 Drawing Sheets

(56) References Cited

U.S. PATENT DOCUMENTS

| | | | | |
|---|---|---|---|---|
| 5,366,821 | A | * | 11/1994 | Merritt et al. ............... 429/422 |
| 5,808,245 | A | * | 9/1998 | Wiese et al. ................. 181/255 |
| 6,152,258 | A | * | 11/2000 | Deavers et al. .............. 181/282 |
| 6,869,469 | B2 | * | 3/2005 | Grover et al. .................. 96/417 |
| 7,014,932 | B2 | * | 3/2006 | Halter et al. ................. 429/418 |
| 7,878,298 | B2 | * | 2/2011 | Winter et al. ................ 181/227 |
| 7,892,682 | B2 | * | 2/2011 | Ando et al. .................. 429/428 |
| 8,118,129 | B2 | * | 2/2012 | Ito et al. ....................... 180/225 |
| 8,158,298 | B2 | * | 4/2012 | Hasegawa .................... 429/446 |
| 8,418,788 | B2 | * | 4/2013 | Jufuku et al. .............. 180/65.31 |
| 8,460,836 | B2 | * | 6/2013 | Kim et al. .................... 429/452 |
| 2004/0149515 | A1 | * | 8/2004 | Toyoshima ................... 181/258 |
| 2010/0297514 | A1 | * | 11/2010 | Jufuku et al. ................ 429/428 |
| 2013/0164643 | A1 | * | 6/2013 | Heo et al. ..................... 429/428 |

FOREIGN PATENT DOCUMENTS

| | | |
|---|---|---|
| EP | 1447534 A2 | 8/2004 |
| JP | 2005-160187 A | 6/2005 |
| JP | 2005171874 A | 6/2005 |
| JP | 2010-157382 A | 7/2010 |
| KR | 1020070105369 A | 10/2007 |

OTHER PUBLICATIONS

EPO Office action dated Jun. 18, 2014, for corresponding European Patent application 12188886.1, (4 pages).

* cited by examiner

HYBRID SILENCER WITH GAS-LIQUID SEPARATING FUNCTION IN FUEL CELL SYSTEM

CROSS-REFERENCE TO RELATED APPLICATIONS

This application claims priority to Korean Patent Application No. 10-2012-0003445, filed on Jan. 11, 2012, and all the benefits accruing therefrom under 35 U.S.C. §119, the content of which in its entirety is herein incorporated by reference.

BACKGROUND

1. Field

The present disclosure relates to a fuel cell system, and more particularly, to a silencer for reducing acoustic noise of a fuel cell system.

2. Description of the Related Art

A fuel cell is an environmentally friendly alternative energy technology that generates electric energy from a material that abundantly exists on earth, such as hydrogen, and has been drawing attention along with solar cells, or the like. In a fuel cell, a fuel, water and air are supplied to the fuel cell to generate power therein. Accordingly, several mechanical devices for supplying such materials are employed in a fuel cell system, and acoustic noise is generated while driving the mechanical devices. Since, if the acoustic noise of the fuel cell system is too loud, it may be unpleasant for a user and other people nearby, apparatuses for reducing the acoustic noise generated in the fuel cell system are being developed.

SUMMARY

Provided is a hybrid silencer which reduces acoustic noise in a predetermined frequency band generated in a fuel cell system while separating a gas component and a liquid component from a fluid flowing inside the fuel cell system.

Provided is a fuel cell system in which the hybrid silencer is installed.

Additional aspects will be set forth in part in the description which follows and, in part, will be apparent from the description, or may be learned by practice of the embodiments described herein.

According to an embodiment of the invention, a hybrid silencer in a fuel cell system includes: an expansion chamber connected to a predetermined apparatus of the fuel cell system, where the expansion chamber reduces acoustic noise of a fluid discharged from the predetermined apparatus; a water-absorber disposed inside the expansion chamber, where the water-absorber absorbs a liquid component of a fluid which flows into the expansion chamber; and a perforated silencer which discharges the fluid, from which the liquid component is removed by the water-absorber, while reducing acoustic noise of the fluid being discharged, where the expansion chamber includes an inlet pipe which receives the fluid from the predetermined apparatus, and an outlet pipe which discharges the liquid component absorbed by the water-absorber.

In an embodiment, the perforated silencer may include a cavity defined in an inner space of the hybrid silencer, and a perforated pipe extending through the cavity.

In an embodiment, the perforated silencer may further include a plurality of partitions disposed in the cavity, where the partitions divide the cavity into a plurality of sub-cavities.

In an embodiment, the hybrid silencer may have a shape defined by two boxes having different volumes and combined each other, where the cavity may be in an inner space of a box having a smaller volume.

In an embodiment, a contacting portion of the two combined boxes is opened, an inlet of the perforated pipe may be disposed at the contacting portion, and the water-absorber may have a space, through which a fluid, which is flowed into the inlet pipe of the expansion chamber, flows to the inlet of the perforated pipe such that the fluid, from which the liquid component is removed by the water-absorber, is discharged through the perforated pipe.

In an embodiment, the hybrid silencer may have a shape defined by two boxes having different volumes and combined each other, where the expansion chamber may be in an inner space of a box having a larger volume, and the inlet pipe may be disposed in a space generated due to a size difference between the expansion chamber and the perforated silencer.

In an embodiment, the hybrid silencer may further include a silencer disposed in the water-absorber, where the silencer reduces acoustic noise of the fluid flowed from the expansion chamber.

In an embodiment, the silencer disposed in the water-absorber may reduce acoustic noise of the fluid flowed from the expansion chamber in a frequency band which is different from a frequency band of acoustic noise reduced by the expansion chamber and perforated silencer.

In an embodiment, the silencer disposed in the water-absorber may include a Helmholtz resonator.

According to another embodiment of the invention, a fuel cell system includes: a fuel cell which generates power using a fuel; a hybrid silencer which separates and discharges a gas component and a liquid component from a fluid flowing inside the fuel cell system, while reducing acoustic noise of the fluid; and a balance of plants which mixes and supplies the liquid component discharged from the hybrid silencer and the fuel to the fuel cell.

In an embodiment, the hybrid silencer may separate and discharge a gas component and a liquid component from a fluid discharged from the fuel cell, while reducing acoustic noise of the fluid discharged from the fuel cell.

In an embodiment, the balance of plants may include a heat exchanger which cools down a fluid discharged from an outlet at a cathode of the fuel cell, where the hybrid silencer may separate and discharge a gas component and a liquid component from a fluid discharged from the heat exchanger, while reducing acoustic noise of the fluid discharged from the heat exchanger.

In an embodiment, the hybrid silencer may include: an expansion chamber connected to a predetermined apparatus of the fuel cell system, where the expansion chamber reduces acoustic noise of a fluid discharged from the predetermined apparatus; a water-absorber disposed inside the expansion chamber, where the water-absorber absorbs a liquid component of a fluid which flows into the expansion chamber; and a perforated silencer which discharges the fluid from which the liquid component is removed by the water-absorber, while reducing acoustic noise of the fluid discharged therefrom.

BRIEF DESCRIPTION OF THE DRAWINGS

These and/or other features will become apparent and more readily appreciated from the following description of the embodiments, taken in conjunction with the accompanying drawings of which.

DETAILED DESCRIPTION

Figure 1:
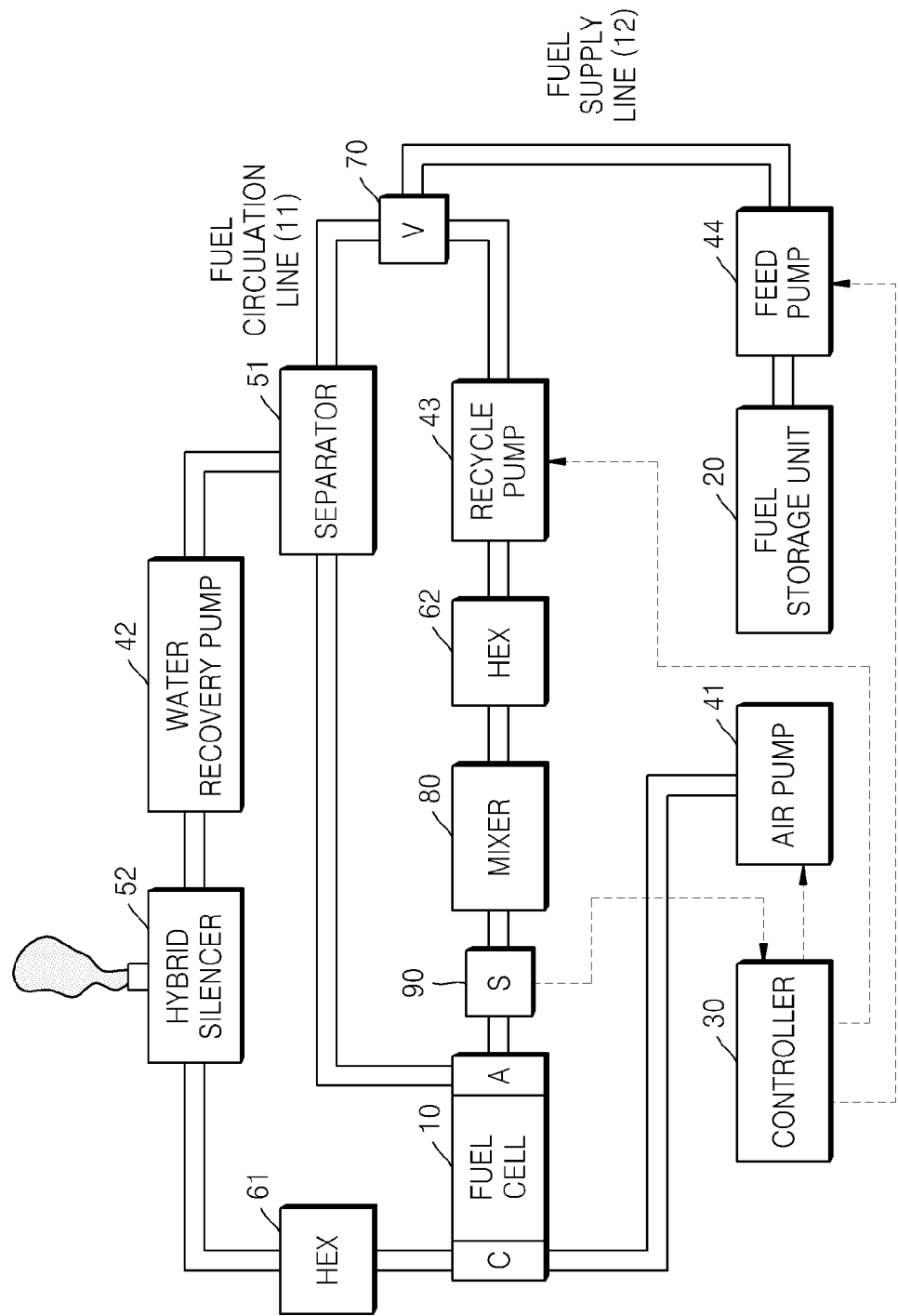
FIG. 1 is a block diagram showing an embodiment of a fuel cell system according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

Reference will now be made in detail to embodiments, examples of which are illustrated in the accompanying drawings. A fuel cell system generally includes a fuel cell for generating power, a balance of plants ("BOP") constituting peripheral devices of the fuel cell for supplying a fuel, water and air to the fuel cell, and a converter for converting and supplying the power output from the fuel cell to a load. Since embodiments of the invention are related to a silencer that reduces acoustic noise of air flowing inside a fuel cell system, detailed description of other elements of the fuel cell system, e.g., a stack forming a fuel cell, a BOP and a converter will be omitted herein. Generally, a fuel cell is designed in a stack shape in which a plurality of cells are combined in series or in parallel, according to power requested by a load. Hereinafter, both one cell and a stack in which a plurality of cells are combined are simply referred to as a fuel cell.

FIG. 1 is a block diagram of an embodiment of a fuel cell system according to the invention. Referring to FIG. 1, an embodiment of the fuel cell system includes a fuel cell 10, a fuel storage unit 20, a controller 30, an air pump 41, a water recovery pump 42, a recycle pump 43, a feed pump 44, a separator 51, a hybrid silencer 52, a first heat exchanger ("HEX") 61, a second heat exchanger ("HEX") 62, a valve module ("V") 70, a mixer 80, and a sensor ("S") 90. In an embodiment, elements for supplying a fuel, water, air, or the like to the fuel cell 10, e.g., elements described above other than the fuel cell 10, are referred to as a BOP. In an embodiment, as shown in FIG. 1, several pipes connecting elements of the BOP are provided between the elements of the BOP. In such an embodiment, the fuel cell system may include elements other than those shown in FIG. 1. In an alternative embodiment, the fuel cell system may include a thermistor for detecting a temperature of the fuel cell 10 installed therein, a filter for removing impurities of a fuel flowing through a pipe connected to the sensor 90 or the like installed in the pipe, or a fan installed in the first and second heat exchangers 61 and 62 to cool down the first and second heat exchangers 61 and 62.

The fuel cell 10 is a power generating apparatus that generates direct current ("DC") power by converting chemical energy in a fuel to direct electrical energy by using an electrochemical reaction. In an embodiment, the fuel cell 10 includes a solid oxide fuel cell ("SOFC"), a polymer electrolyte membrane fuel cell ("PEMFC"), and a direct methanol fuel cell ("DMFC"), for example. In one embodiment, as shown in FIG. 1, the fuel cell system is a fuel cell system to which a BOP for driving a DMFC is applied. However, a technical feature of reducing acoustic noise of the air pump 41 described below may also be applied to a different type of fuel cell.

In an embodiment, unlike an embodiment including an indirect methanol fuel cell that reforms methanol to have increased hydrogen concentration, the DMFC generates hydrogen ions and electrons as methanol and water directly react with each other in an anode of the fuel cell 10 without reforming of methanol. In such an embodiment, the DMFC does not perform such a reforming process, and a size of the DMFC may be reduced and used in a portable fuel cell system.

In an anode of the DMFC, a reaction of $CH_3OH+H_2O \rightarrow 6H++6e-+CO_2$ is generated, and in a cathode, a reaction of $3/2O_2+6H++6e- \rightarrow 3H_2O$ is generated. A proton (H+) is transferred through a proton exchange membrane in the fuel cell 10, and an electron (e−) is transferred from an anode to a cathode through an external circuit. Power is generated through such processes. Specifically, a catalyst exists in the DMFC such that a reaction in the fuel cell 10 is efficiently performed. Generally, the catalyst includes platinum, and may be deteriorated when a temperature during the processes is too high. Accordingly, pure methanol is not supplied to the fuel cell, but methanol diluted by a suitable amount of water, i.e., a methanol aqueous solution having suitable concentration, is supplied to the fuel cell 10. Hereinafter, the methanol aqueous solution supplied to an inlet at the anode of the fuel cell 10 will be simply referred to as a fuel.

As described above, in an embodiment, suitable amounts of methanol, water, and air are supplied to the fuel cell 10 so that the reaction in the fuel cell 10 is efficiently performed while effectively preventing deterioration of the fuel cell 10. The controller 30 controls the air pump 41, the feed pump 44, the recycle pump 43, and the water recovery pump 42 to adjust amounts of fuel, water, and air supplied to the fuel cell 10 based on concentration, temperature, or the like of the fuel detected by the sensor 90. The fuel cell 10 generates power using a fuel having suitable concentration supplied from the mixer 80 to the inlet at the anode of the fuel cell 10. During a power generating process of the fuel cell 10, a fluid including carbon dioxide, water, and an unreacted fuel constituting by-products of the above reaction processes are discharged from an outlet at the anode 'A' of the fuel cell 10, and from an outlet at the cathode 'C' of the fuel cell 10.

In an embodiment, several mechanical devices, such as pumps and separators as described above, are driven in the fuel cell system to generate power in the fuel cell 10, and acoustic noise may be generated while driving the mechanical devices. If acoustic noise of the fuel cell system is substantially loud, it may be unpleasant for a user and other people nearby. In an embodiment, loud acoustic noise of the fuel cell system is substantially reduced. Also, even if acoustic noise of the fuel cell system is not substantially loud, acoustic noise in a predetermined frequency band is reduced according to circumstances. In an embodiment, for example, where the fuel cell system is employed in a military device, acoustic noise having a sound pressure level in an about ⅓ octave band unit in a frequency band from about 50 hertz (Hz) to about 10 kilohertz (kHz) at a location about 10 meters (m) away from the military device is allowed to effectively prevent the military device from being exposed to an enemy due to its acoustic noise.

In an embodiment, as shown in FIG. 1, where the fuel cell system is a portable fuel cell system employing a DMFC, an inner space of the fuel cell system is relatively small. In such an embodiment, the fuel cell system may be configured to have a function of reducing an acoustic noise as well as an existing function without additionally including a new apparatus to the fuel cell system, to reduce acoustic noise thereof. The hybrid silencer 52 separates and discharges a gas component and a liquid component from a fluid flowing inside the fuel cell system while effectively reducing acoustic noise of the fluid. In an embodiment, the hybrid silencer 52 is a silencer having a hybrid structure for the function of reducing the acoustic noise of the fluid flowing inside the fuel cell system as well as the existing function of separating and discharging the gas component and the liquid component from the fluid. In an embodiment, for example, the hybrid silencer 52 may separate and discharge the gas component and the liquid component form the fluid discharged from the fuel cell 10 while reducing acoustic noise of the fluid discharged from the fuel cell 10. The BOP of the fuel cell system mixes the liquid component and the fuel discharged from the hybrid silencer 52, and supplies the mixture to the fuel cell 10. An embodiment of the hybrid silencer 52 will now be described with reference to FIG. 1.

Referring to FIG. 1, the hybrid silencer 52 separates and discharges the gas component and the liquid component from fluid discharged from the first heat exchanger 61 while reducing acoustic noise of the fluid discharged from the first heat exchanger 61. The liquid component, e.g., water, or the like, separated from the fluid by the hybrid silencer 52 is sucked in by the water recovery pump 42. The gas component, e.g., carbon dioxide, or the like, separated from the fluid by the hybrid silencer 52 is exhausted to the outside of the fuel cell system. A by-products discharged from the outlet at the cathode of the fuel cell 10 may include moisture in a vapor form as a high temperature fluid due to heat of reaction in the fuel cell 10. The first heat exchanger 61 cools down the fluid at the cathode of the fuel cell via a heat exchange process.

The separator 51 recovers methanol and water by separating methanol and water from the fluid discharged from the outlet at the anode of the fuel cell 10. In an embodiment, for example, the separator 51 may separate methanol and water from the by-products and the unreacted fuel discharged from the fuel cell 10 via centrifugation, or the like. The water recovery pump 42 sucks the water recovered by the hybrid silencer 52 and discharges the sucked water to the separator 51. In such an embodiment, the separator 51 discharges a fuel having low concentration in which methanol recovered by the separator 51 and water recovered by the hybrid silencer 52 are mixed.

The fuel storage unit 20 is a container for storing a fuel, and may have any shape, such as a cylindrical shape or a box shape, for example. In an embodiment, the fuel storage unit 20 may be configured such that a fuel is refilled. In an embodiment, the fuel storage unit 20 may be detachably attached to the fuel cell system of FIG. 1, and may be referred to as a cartridge. The fuel storage unit 20 stores a fuel having high concentration, for example, about 100% methanol.

In an embodiment, the valve module 70 may be provided at a point where a fuel circulation line 11 and a fuel supply line 12 are connected so as to control a flow of a low concentration fuel circulated through the fuel circulation line 11 and a flow of a high concentration fuel supplied from the fuel storage unit 20 to the fuel cell 10 through the fuel supply line 12. In such an embodiment, the fuel circulation line 11 denotes pipes in a path of an unreacted fuel discharged from the fuel cell 10 and flowing back to the fuel cell 10, and the fuel supply line 12 denotes pipes in a path of a newly supplied fuel from the fuel storage unit 20 to the fuel cell 10.

The recycle pump 43 sucks at least one of the low concentration fuel transferred from the valve module 70 through the fuel circulation line 11 and the high concentration fuel transferred from the valve module 70 through the fuel supply line 12 and discharges the sucked fuel to the mixer 80 through the second heat exchanger 62, based on a fuel flow control of the valve module 70. A temperature of the fuel discharged from the recycle pump 43 is adjusted by a heat exchange process of the second heat exchanger 62 as the fuel passes through the second heat exchanger 62. The mixer 80 mixes the low concentration fuel and the high concentration fuel discharged from the recycle pump 43, and the mixer 80 supplies a fuel having suitable concentration generated through such a mixing process to the fuel cell 10.

The first heat exchanger 61 controls a temperature of the fluid discharged from the cathode of the fuel cell 10. In an embodiment, the first heat exchanger 61 is disposed at a predetermined point of a pipe line through which the fluid discharged from the fuel cell 10 flows, for example, at the outlet at the cathode of the fuel cell 10. The second heat exchanger 62 controls a temperature of the fuel supplied to the inlet at the anode of the fuel cell 10. In an embodiment, the second heat exchanger is disposed at a predetermined point of a pipe line through which the fuel supplied to the fuel cell 10 flows, for example, between the recycle pump 43 and the mixer 80. The first and second heat exchangers 61 and 62 may include a metal pipe, a tank, or the like such that a fluid flowing inside a pipe of the fuel cell system and a medium outside the pipe effectively exchange heat.

The acoustic noise of the fluid discharged from the first heat exchanger 61 has acoustic noise characteristics in which periodic acoustic noise components generated during a regular pumping operation of the air pump 41 or the like, and aperiodic acoustic noise components generated due to a friction and vortex phenomenon of the fluid in a pipe are mixed. An embodiment of the hybrid silencer 52 that reduces acoustic noise of a fluid having such characteristics will now be described.

Figure 2A:
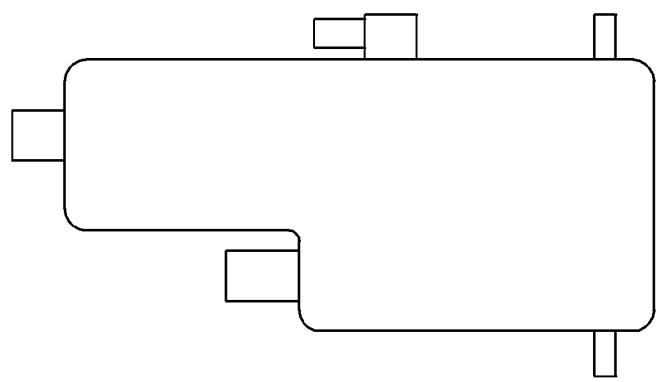
FIGS. 2A through 2D are diagrams of an external shape of an embodiment of a hybrid silencer according to the invention.
Figure 2B:
Figure 2C:
Figure 2D:
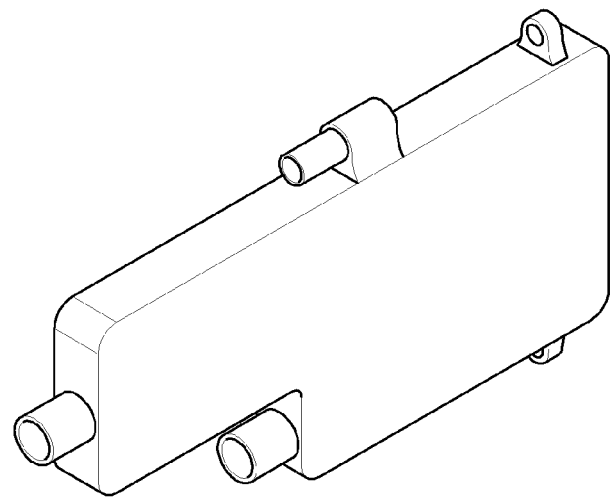

FIGS. 2A through 2D are diagrams of an external shape of an embodiment of the hybrid silencer 52 according to the invention. FIG. 2A is a front view of the external shape of the hybrid silencer 52, FIG. 2B is a left side view of the external shape of the hybrid silencer 52, FIG. 2C is a right side view of the external shape of the hybrid silencer 52, and FIG. 2D is a perspective view of the external shape of the hybrid silencer 52. In an embodiment, the hybrid silencer 52 may have a box shape, but not being limited thereto. In an alternative embodiment, the hybrid silencer 52 may have any shape, such as a cylindrical shape, for example. In an embodiment, where the fuel cell system has a box shape and peripheral devices in the fuel cell system also have box shapes, the hybrid silencer 52 may have a box shape such that utility of an inner space of the fuel cell system substantially improved.

Figure 3A:
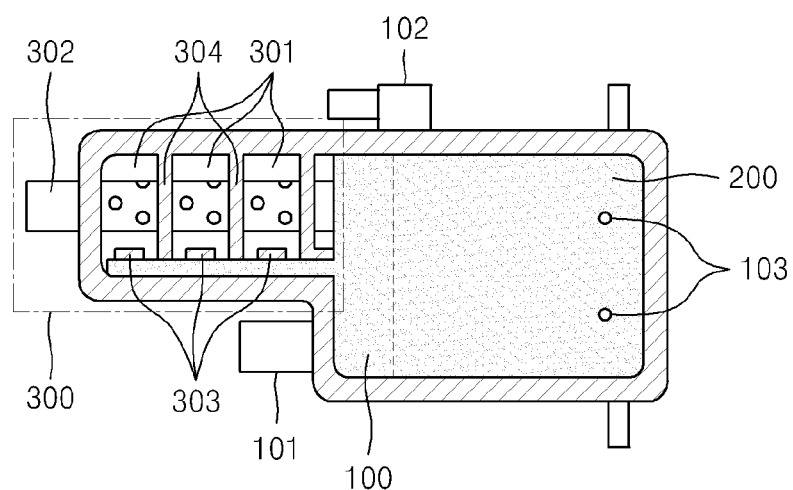
FIGS. 3A and 3B are diagrams of an internal shape of an embodiment of a hybrid silencer according to the invention.
Figure 3B:
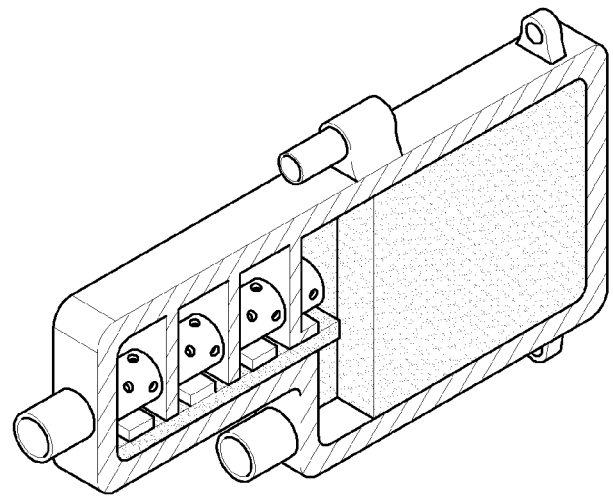

FIGS. 3A and 3B are diagrams of an internal shape of an embodiment the hybrid silencer 52 according to the invention. FIG. 3A is a front view of the internal shape of the hybrid silencer 52 and FIG. 3B is a perspective view of the internal shape of the hybrid silencer 52. Referring to FIG. 3A, an embodiment of the hybrid silencer 52 includes an expansion chamber 100, a water-absorber 200, and a perforated silencer 300. The expansion chamber 100 is connected to an apparatus that discharges a fluid from the fuel cell system of FIG. 1, for example, the first heat exchanger 61 such that acoustic noise of the fluid discharged from the first heat exchanger 61 is reduced. The water-absorber 200 is disposed inside the expansion chamber 100, and absorbs the liquid component of the fluid that has flowed into the expansion chamber 100. The perforated silencer 300 externally discharges the fluid, from which the liquid component is removed by the water-absorber 200 while reducing acoustic noise of the fluid being discharged.

The expansion chamber 100 is connected to the first heat exchanger 61, and includes an inlet pipe 101, into which the fluid flows from the first heat exchanger 61, and an outlet pipe 102, from which the liquid component absorbed to the water-absorber 200 is discharged. The water-absorber 200 is disposed between the inlet pipe 101 and the outlet pipe 102 of the expansion chamber 100, and effectively prevents the fluid that has flowed into the inlet pipe 101 from being discharged to the outlet pipe 102 without passing through the water-absorber 200. Accordingly, the liquid component absorbed to the water-absorber 200 may be discharged from the outlet pipe 102. As described above, a substantial portion of components of the fluid discharged from the outlet pipe 102 and sucked in by the water recovery pump 42 is water. In an embodiment, as shown in FIG. 3A, the water-absorber 200 is not disposed between the inlet pipe 101 of the expansion chamber 100 and an inlet of the perforated silencer 300, and the fluid that has flowed into the inlet pipe 101 may be discharged directly to the outlet pipe 102 without passing through the water-absorber 200. In such an embodiment, the fluid, from which the liquid component is removed by the water-absorber 200, may be discharged from the perforated silencer 300. As described above, a substantial portion of components of the fluid discharged from the perforated silencer 300 is carbon dioxide.

The hybrid silencer 52 may include bars 103 disposed inside the expansion chamber 100 to fix the water-absorber 200. In an embodiment, the bars 103 may be inserted into holes formed in the water-absorber 200. In an embodiment, the water-absorber 200 includes a sponge, cotton and paper, for example. The water-absorber 200 is disposed in the hybrid silencer 52, as shown in FIGS. 3A and 3B, such that absorbing power and durability to endure water drops irregularly appeared from the inlet pipe 101 are substantially improved. In such an embodiment, the hybrid silencer 52 including the water-absorber 200 may substantially maintain an original shape thereof when a pressure is applied thereto due to external effects, such as a density change of a fluid in the expansion chamber 100. In one embodiment, for example, a sponge may be used as the water-absorber 200 in FIGS. 3A and 3B.

Generally, in an expansion silencer, some sound waves incident on the expansion silencer are reflected and remaining sound waves proceed to an expansion chamber due to a difference between a cross-section of an inlet pipe and a cross-section of the expansion chamber, and then some of the sound waves that proceeded to the expansion chamber are reflected and remaining sound waves proceed to an outlet pipe due to a difference between the cross-section of the expansion chamber and a cross-section of the outlet pipe. As such, acoustic noise is reduced by the expansion silencer as some sound waves incident on the expansion silencer are reflected. When 'A1' denotes the cross-section of the inlet and outlet pipes of the expansion silencer, 'A2' denotes the cross-section of the expansion chamber, and 'L' denotes a length of the expansion chamber, a transmission loss of the expansion silencer may be calculated from Equation 1 below. In Equation 1, 'f' denotes a target frequency of acoustic noise to be reduced by the expansion silencer, and 'c' denotes a sound speed.

$$TL = 10\log\left[1 + \frac{1}{4}\left(m - \frac{1}{m}\right)^2 \sin^2 KL\right] dB, \quad m = \frac{A_2}{A_1}, \quad K = \frac{2\pi f}{c} \quad \text{[Equation 1]}$$

As shown in Equation 1, the transmission loss of the expansion silencer is maximum when a ratio of the cross-section of the inlet and outlet pipes of the expansion silencer and the cross-section of the expansion chamber is high and KL is $n\pi/2$ (n=1, 3, 5, ... ), that is, when L is nc/4f (n=1, 3, 5, ... ). In an embodiment, where the fuel cell system is a small portable fuel cell system, the size of the fuel cell system may be substantially small. In an embodiment of a fuel cell system, a transmission loss increases as an inner volume of the expansion chamber 100 increases. In such an embodiment, the expansion chamber 100 and the perforated silencer 300 may be configured to substantially reduce or effectively minimize idle space in a space of the fuel cell system occupied by the hybrid silencer 52 of FIGS. 3A and 3B such that a volume of the expansion chamber 100 is substantially increased within the space of the fuel cell system occupied the hybrid silencer 52. Referring to FIGS. 3A and 3B, the hybrid silencer 52 has a shape in which two boxes having different volumes are combined, where the expansion chamber 100 is provided in an inner space of a box having a larger volume, and the inlet pipe 101 is provided in a space generated due to a size difference between the expansion chamber 100 and the perforated silencer 300.

The perforated silencer 300 includes a cavity 301 formed in an inner space of the hybrid silencer 52, e.g., in an inner space of a box having a smaller volume, and a perforated pipe 302 extending through the cavity 301. The perforated silencer 300 is a type of a resonant silencer, and has a structure where sound waves of a resonant frequency are generated as air that has flowed into the cavity 301 through a plurality of holes acts as a spring. Sound waves in a reverse phase reflected by a resonator cancel out sound waves in the same resonant frequency as the reflected waves. Accordingly, a transmission loss of the perforated silencer 300 is the maximum in the resonant frequency. When 'V' denotes a volume of the cavity 301 of the perforated silencer 300, 'n' denotes the number of holes of the perforated pipe 302, and 'Sp' denotes a cross-section area of one hole, a resonant frequency Fp of the perforated silencer 300 may be calculated from Equation 2 below. In Equation 2, 'c' denotes a sound speed, and 'Lp' denotes a thickness of a perforated pipe+1.6×a radius of a hole.

$$F_p = \frac{c}{2\pi}\sqrt{\frac{nSp}{VLp}} \text{ Hz} \quad \text{[Equation 2]}$$

When the resonant frequency Fp of the perforated silencer 300 is calculated according to Equation 2, and 'So' denotes a cross-section area of an outlet of the perforated pipe 302, a transmission loss of the perforated silencer 300 may be calculated according to Equation 3 below. In Equation 3, 'F' denotes a center frequency of a frequency band to be reduced by the hybrid silencer 300 of FIGS. 3A and 3B.

$$TL = 10\log\left|1 + \left\{\frac{\frac{\sqrt{nVSp}}{2SoLp}}{\frac{F}{Fp} - \frac{Fp}{F}}\right\}^2\right| dB \quad \text{[Equation 3]}$$

As shown in Equation 2, a resonant frequency of a perforated resonator is determined by the volume of the cavity 301, and the number and cross-section areas of the holes of the perforated pipe 302. Also, as shown in Equation 3, the transmission loss of the perforated silencer 300 may be determined by the above elements that determines the resonant frequency and the cross-section area of the outlet of the perforated pipe 302. Since a square root is applied to the volume of the cavity 301 in Equation 3, the transmission loss of the perforated silencer 300 is not substantially affected by the volume of the cavity 301. Accordingly, in an embodiment, the expansion chamber 100 is provided in the inner space of the box having the larger volume and the perforated silencer 300 is provided in the inner space of the box having the smaller volume.

As shown in FIGS. 3A and 3B, the two boxes are connected to each other via a contacting portion, which is opened, and the inlet of the perforated pipe 302 is disposed at such an opened contacting portion. A space that allows the fluid that has flowed into the inlet pipe 101 of the expansion chamber 100 to flow to the inlet of the perforated pipe 302 is formed in the water-absorber 200, and thus the fluid, from which the liquid component is removed by the water-absorber 200, is discharged through the perforated pipe 302. Also, a part of the water-absorber 200 is disposed in the cavity 301 of the perforated silencer 300, and thus the liquid component of the fluid discharged from the holes of the perforated pipe 302 is absorbed by the part of the water-absorber 200 in the cavity 301. Bars 303 that fix the part of the water-absorber 200 in the cavity 301 may be disposed in the cavity 301.

Figure 4A:
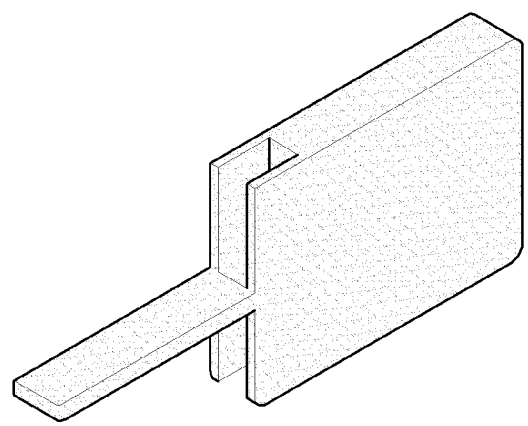
FIGS. 4A and 4B are diagrams of embodiments of a water-absorber of FIGS. 3A and 3B according to embodiments of the invention.
Figure 4B:
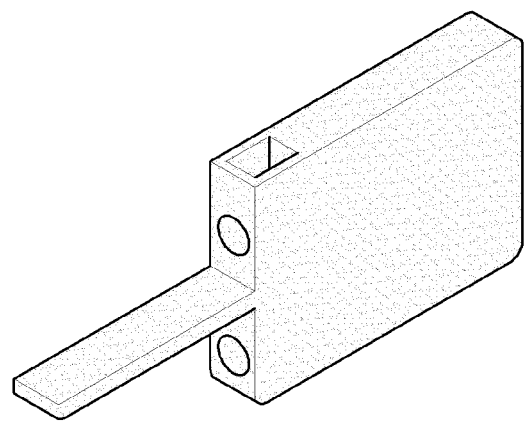

FIGS. 4A and 4B are diagrams of embodiments of the water-absorber 200 of FIGS. 3A and 3B according to the invention. In an embodiment, as shown in FIG. 4A, a part of the water-absorber 200 is sunken, and such a sunken space forms a space that allows the fluid that has flowed into the inlet pipe 101 of the expansion chamber 100 to flow to the inlet of the perforated pipe 302. In such an embodiment, the part of the water-absorber 200 disposed inside the cavity 301 is combined to a protruding portion of a sunken surface of the wafer-absorber 200. In an alternative embodiment, as shown in FIG. 4B, the water-absorber 200 has a shape of a passage, where a space for flowing the fluid that has flowed into the inlet pipe 101 of the expansion chamber 100 to the inlet of the perforated pipe 302 has a rectangular box shape, and holes, into which the inlet pipe 101 of the expansion chamber 100 and the inlet of the perforated pipe 302 are inserted, are formed on the passage. In such an embodiment, the part of the water-absorber 200 disposed inside the cavity 301 is combined to an outer wall of a sponge between holes, into which the inlet pipe 101 of the expansion chamber 100 and the inlet of the perforated pipe 302 are inserted.

Since the volume of the water-absorber 200 of FIG. 4B is larger than the volume of the water-absorber 200 of FIG. 4A, absorption capability of the water-absorber 200 of FIG. 4B may be greater than absorption capability of the water-absorber 200 of FIG. 4A, while a manufacturing process of the water-absorber 200 of FIG. 4B may be more complicated than a manufacturing process of the water-absorber 200 of FIG. 4A due to a more complicated structure thereof. In an embodiment, a shape of the water-absorber 200 may be determined based on using environments and manufacturing unit costs, for example, of the fuel cell system. In an embodiment, the shape of the water-absorber 200 is not limited to those shown in FIGS. 4A and 4B, but the water-absorber 200 may have various shapes.

The expansion chamber 100 has an acoustic noise reduction structure including a cross-section different from a cross-section of the inlet pipe 101. In such an embodiment, an acoustic noise is further reduced when some sound waves in the inlet pipe 101 are absorbed by the water-absorber 200, such as a sponge, and some sound waves are reflected by the water-absorber 200 and transmitted to the perforated pipe 302. In such an embodiment, acoustic noise may be generated when water drops in the expansion chamber 100 hit an inner wall of the expansion chamber 100 at a certain speed. In such an embodiment, the water drops are absorbed by the water-absorber 200, and acoustic noise due to collision of the water drops is thereby reduced. The acoustic noise reduction structure of the expansion chamber 100 may have a high acoustic noise reduction performance at a low frequency band lower than about 1 kilohertz (kHz), but may have a low acoustic noise reduction performance at a high frequency band equal to or higher than about 1 kHz. In an embodiment, the perforated silencer 300 of FIGS. 3A and 3B may reduce acoustic noise in a frequency band equal to or higher than about 4 kHz. In such an embodiment, where the perforated silencer 300 having a low acoustic noise reduction performance in a frequency band equal to or higher than about 4 kHz is included, partitions 304 are further provided in the cavity 301 of the perforated silencer 300, as shown in FIGS. 3A and 3B, thereby dividing the cavity 301 into a plurality of sub-cavities by the partitions 304 such that a high acoustic noise reduction performance is obtained in the frequency band equal to or higher than about 4 kHz.

As shown in Equation 2 above, a resonant frequency is increased when the volume of the cavity 301 of the perforated silencer 300 is decreased. Since the transmission loss of the perforated silencer 300 is the maximum at the resonant frequency, when the cavity 301 of the perforated silencer 300 is divided into a plurality of sub-cavities by the partitions 304, a frequency, where the transmission loss is the maximum, is increased. The number of partitions 304 is substantially proportional to a center frequency of a frequency band to be reduced by the perforated silencer 300. As such, a high acoustic noise reduction performance may be obtained in the frequency band equal to or higher than about 4 kHz based on the sub-cavities defined by the partitions 304. FIGS. 3A and 3B illustrate an embodiment where two partitions 304 and three sub-cavities defined by the two partitions 304. In such an embodiment, the perforated silencer 300 has a high acoustic noise reduction performance at the frequency band equal to or higher than about 4 kHz. However, the number of partitions 304 is not limited to those in FIGS. 3A and 3B. In an alternative embodiment, the number of partitions 304 may be adjusted based on the frequency band to be reduced by the perforated silencer 300. In alternative embodiments, for example, one or three partitions 304 may be provided in the cavity 301.

In an embodiment, where the hybrid silencer 52 includes the expansion chamber 100 and the perforated silencer 300, an acoustic noise reduction performance may not be obtained in a frequency band from about 1 kHz to about 4 kHz. In an embodiment, where the hybrid silencer 52 of FIGS. 3A and 4B has a substantially small size, acoustic noise reduction in the low frequency band lower than about 1 kHz may not be obtained due to small inner space of the expansion chamber 100. In such an embodiment, when the absorption capability of the water-absorber 200 is substantially high, the liquid component of the fluid that has flowed into the expansion chamber 100 may be substantially absorbed using the water-absorber 200 having a small volume. In an embodiment, a silencer that reduces acoustic noise of the fluid that has flowed in from the expansion chamber 100 may be further provided in the water-absorber 200 to improve acoustic noise reduction performance of the expansion chamber 100 and the perforated silencer 300. In such an embodiment, the silencer that supplements acoustic noise reduction performances of the expansion chamber 100 and the perforated silencer 300 may be disposed in a space formed inside the water-absorber 200 of FIGS. 3A and 3B.

In an embodiment, a sound pressure level according to frequencies in an about ⅓ octave band unit may be detected by measuring acoustic noise of air that passed through the expansion chamber 100 and the perforated silencer 300, and by performing Fast Fourier Transform ("FFT") in an about ⅓ octave band unit on the measured acoustic noise. Based on results of detecting, a designer of the hybrid silencer 52 may check frequencies having a sound pressure level that violates an acoustic noise condition targeted by the hybrid silencer 52, for example, a condition of allowing only acoustic noise lower than or equal to a certain sound pressure level in an about ⅓ octave band unit in a frequency band from about 50 Hz to about 10 kHz. Then, the designer of the hybrid silencer 52 may determine target frequencies to be reduced with respect to acoustic noise of air that passed through the expansion chamber 100 and the perforated silencer 300, by referring to the frequencies having the sound pressure level that violates the acoustic noise condition.

In an alternative embodiment, the expansion chamber 100 and the perforated silencer 300 may be configured based on the above equations, and a sound pressure level may be analyzed according to frequencies in an about ⅓ octave band unit of the air that passed through the expansion chamber 100 and the perforated silencer 300 based on the configurations of the expansion chamber 100 and the perforated silencer 300. Based on the results of analysis, the designer of the hybrid silencer 52 may determine the target frequencies to be reduced with respect to the acoustic noise of the air that passed through the expansion chamber 100 and the perforated silencer 300. In one embodiment, for example, when the frequencies having the sound pressure level that violates the acoustic noise condition are distributed in a frequency band from about 1 kHz to about 4 kHz, the silencer that reduces center frequencies of the frequency band, e.g., a frequency band from about 2 kHz to about 3 kHz, may be included in the water-absorber 200.

Figure 5A:
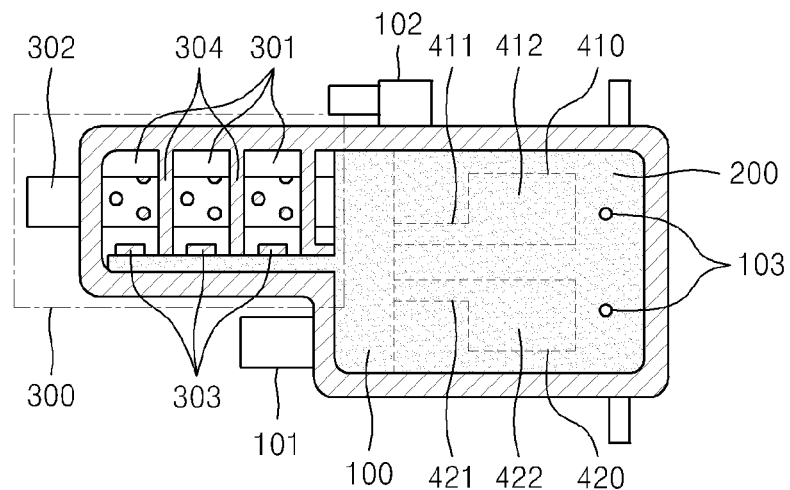
FIGS. 5A and 5B are diagrams showing an embodiment of a silencer in a water-absorber of FIGS. 3A and 3B according to the invention.
Figure 5B:
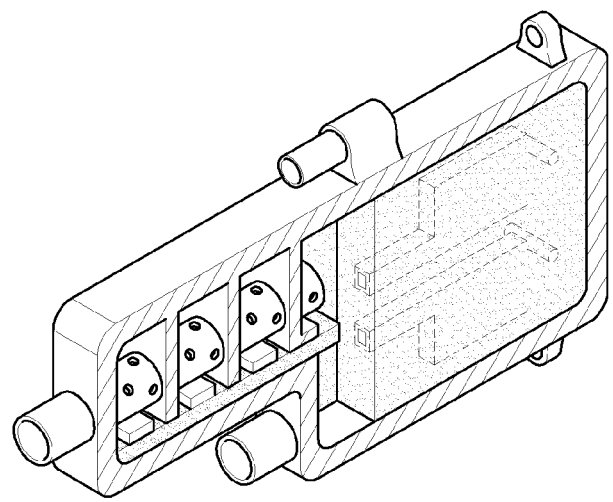

FIGS. 5A and 5B are diagrams showing an embodiment of a silencer in the water-absorber 200 of FIGS. 3A and 3B according to the invention. Referring to FIGS. 5A and 5B, the water-absorber 200 includes two Helmholtz resonators that reduce acoustic noise of a fluid that has flowed in from the expansion chamber 100 in a frequency band that is different from a frequency band of acoustic noise reduced by the expansion chamber 100 and the perforated silencer 300. The Helmholtz resonators may improve an acoustic noise reduction performance in a frequency band from about 1 kHz to about 4 kHz. In an embodiment, the water-absorber 200 occupies a portion of the inside of the expansion chamber 100 to absorb a liquid component of the fluid that has flowed into the expansion chamber 100, the silencer in the water-absorber 200 may have a structure for effectively reducing acoustic noise in a small volume. As described above, since the transmission loss of the resonant silencer is the maximum in the resonant frequency, a frequency band to be reduced by a silencer may be adjusted in the silencer having a predetermined size. Such a resonant silencer includes a Helmholtz resonator, for example. Accordingly, in an embodiment, a Helmholtz resonator may be disposed, e.g., embedded, in the water-absorber 200, as the silencer. When 'V' denotes a volume of a cavity of a Helmholtz resonator, 'L' denotes a length of a neck of the Helmholtz resonator, and 'A' denotes a cross-section area of the neck of the Helmholtz resonator, a resonant frequency Fh of the Helmholtz resonator may be calculated from Equation 4 below. In Equation 4, 'c' denotes a sound speed.

$$Fh = \frac{c}{2\pi}\sqrt{\frac{A}{VL}} \text{ Hz} \qquad \text{[Equation 4]}$$

As shown in Equation 4, since the resonant frequency of the Helmholtz resonator is determined by the volume of the cavity of the Helmholtz resonator, and the length and cross-section of the neck of the Helmholtz resonator, in an embodiment where the silencer includes the Helmholtz resonator, the acoustic noise reduction performance in the frequency band may be effectively reduced by the silencer by adjusting the volume of the cavity, the length and the cross-section of the neck of the Helmholtz resonator when the silencer has a predetermined size. In an embodiment, as shown in FIGS. 5A and 5B, the silencer includes Helmholtz resonators, where a first resonator 410 includes a neck 411 and a cavity 412, and a second resonator 420 includes a neck 421 and a cavity 422. An inlet of the neck 411 of the first resonator 410 and an inlet of the neck 421 of the second resonator 420 contact a surface of the water-absorber 200, and thus the fluid in the expansion chamber 100 is flowed into the first and second resonators 410 and 420. The fluid flowed in the first and second resonators 410 and 420 is discharged into the expansion chamber 100 from the inlet of the neck 411 of the first resonator 410 and the inlet of the neck 421 of the second resonator 420.

As shown in Equation 4, in an embodiment, the length of the neck 411 and the volume of the cavity 412 of the first resonator 410 are inversely proportional to a center frequency of a frequency band to be reduced by the first resonator 410, e.g., a size of a center frequency in a frequency band that is different from a frequency band of acoustic noise reduced by the expansion chamber, and a size of the cross-section of the neck 411 of the first resonator 410 is proportional to a size of the center frequency in the frequency band to be reduced by the first resonator 410. In such an embodiment, the length of the neck 421 and the volume of the cavity 422 of the second resonator 420 are inversely proportional to a center frequency in a frequency band to be reduced by the second resonator 420, e.g., a size of a center frequency in a frequency band that is different from the frequency band of the acoustic noise reduced by the expansion chamber 100, and a size of the cross-section of the neck 421 of the second resonator 420 is proportional to a size of the center frequency in the frequency band to be reduced by the second resonator 420.

In an embodiment, a resonator may be configured based on a target frequency set by the designer, for example, a resonant frequency of about 2 kHz, by adjusting the length and cross-section of the neck 411 of the first resonator 410, and the volume of the cavity 412. In an embodiment, a resonator may be configured based on a target frequency set by the designer, for example, a resonant frequency of about 3 kHz, by adjusting the length and cross-section of the neck 421 of the second resonator, and the volume of the cavity 422. In one embodiment, for example, where the length of the neck 411 is about 7.38 mm, the cross-section of the neck 411 is about 3.288 square millimeters (mm$^2$), and the volume of the cavity 412 is about 364.1 cubic millimeters (mm$^3$), the first resonator 410 has a resonant frequency of about 2365.44 Hz. In one embodiment, for example, where the length of the neck 421 is about 7 millimeters (mm), the cross-section of the neck 421 is about 7 mm$^2$, and the volume of the cavity 422 is about 364.1 mm$^3$, the second resonator 420 has a resonant frequency of about 3599.67 Hz. Here, a sound speed is about 360 meters per second (m/s) assuming that a temperature inside the expansion chamber 100 is about 50° C.

Figure 6A:
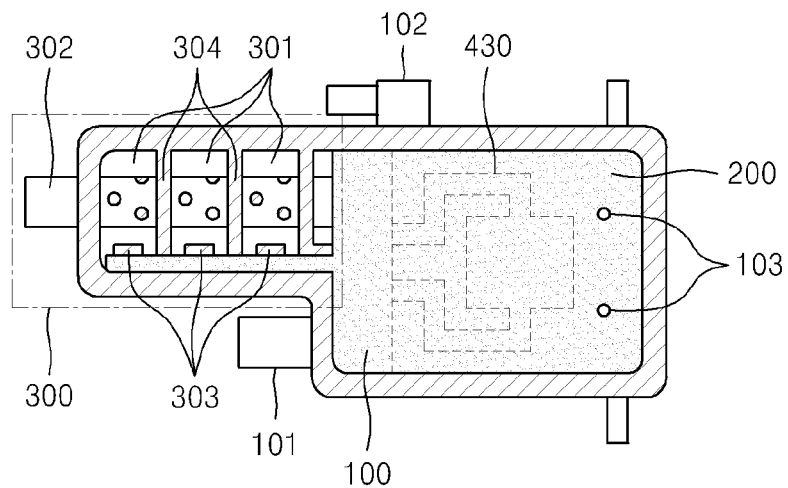
FIGS. 6A and 6B are diagrams showing an alternative embodiment of a silencer in a water-absorber of FIGS. 3A and 3B according to the invention.
Figure 6B:
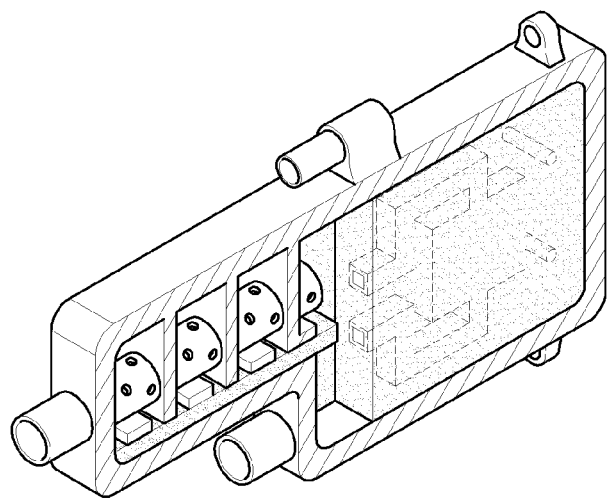

FIGS. 6A and 6B are diagrams showing an alternative embodiment of a silencer in the water-absorber 200 of FIGS. 3A and 3B according to the invention. Referring to FIGS. 6A and 6B, in an embodiment, the water-absorber 200 includes an expansion silencer 430 that reduces acoustic noise of the fluid that has flowed in from the expansion chamber 100, in a frequency band that is different from a frequency band of acoustic noise reduced by the expansion chamber 100 and the perforated silencer 300. The expansion silencer 430 may improve an acoustic noise reduction performance in a low frequency band lower than about 1 kHz. As described above, in an embodiment where an inner space of the expansion chamber 100 is limited such that acoustic noise in the low frequency band lower than or equal to about 1 kHz may not be substantially reduced by the water-absorber 200. In such an embodiment, the expansion silencer 430 may be disposed in the water-absorber 200 as the silencer to increase an acoustic noise reduction performance in the low frequency band lower than or equal to about 1 kHz.

In an alternative embodiment, the water-absorber 200 may include the expansion silencer 430 that reduces acoustic noise of the fluid that has flowed in from the expansion chamber 100 in a frequency band overlapping a predetermined frequency band of the acoustic noise, which is reduced by the expansion chamber 100 and the perforated silencer 300. In such an embodiment, the expansion silencer 430 may be disposed, e.g., embedded, in the water-absorber 200 when the acoustic noise in the predetermined frequency band is not reduced substantially to a predetermined sound pressure level, which may be set by the designer, by the expansion chamber 100 and the perforated silencer 300. In such an embodiment, one partition or a plurality of partitions may be provided, e.g., installed, in the expansion silencer 430 to increase a frequency band that is subject to acoustic noise reduction.

Figure 7A:
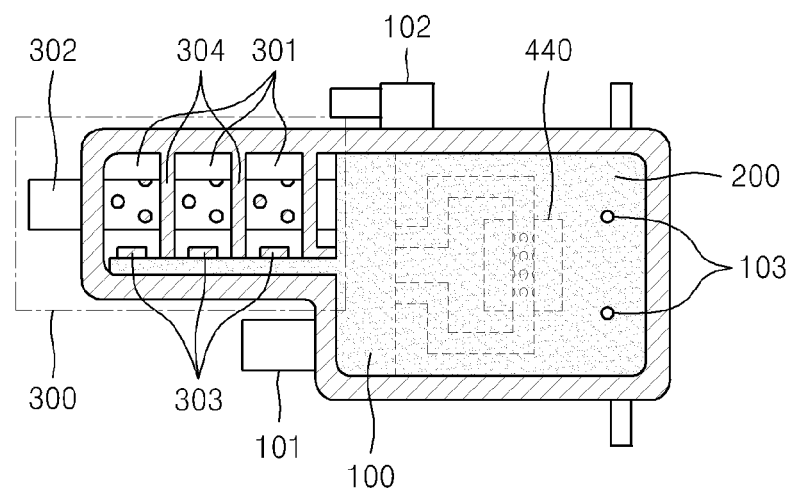
FIGS. 7A and 7B are diagrams showing another alternative embodiment of a silencer in a water-absorber of FIGS. 3A and 3B, according to the invention.
Figure 7B:
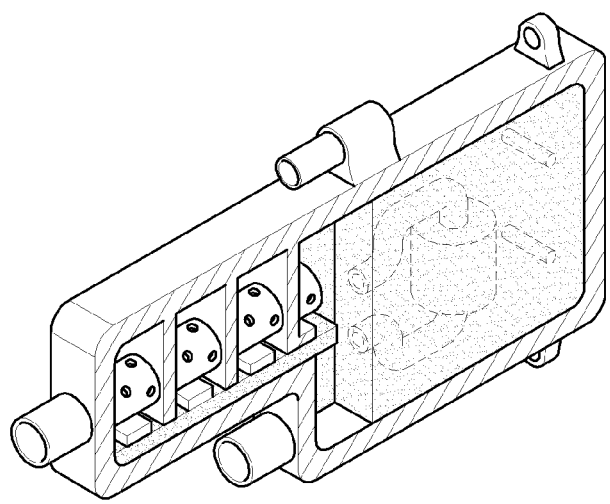

FIGS. 7A and 7B are diagrams showing another alternative embodiment of a silencer in the water-absorber 200 of FIGS. 3A and 3B, according to the invention. Referring to FIGS. 7A and 7B, in an embodiment, a perforated silencer 440 is disposed in the water-absorber 200. The perforated silencer 440 reduces acoustic noise of the fluid that has flowed in from the expansion chamber 100 in a frequency band that is different from the frequency band of the acoustic noise reduced by the expansion chamber 100 and the perforated silencer 300. The perforated silencer 440 may improve acoustic noise reduction performance in a low frequency band lower than about 1 kHz. In an alternative embodiment, the perforated silencer 400 may reduce acoustic noise of the fluid that has flowed in from the expansion chamber 100 in a frequency band overlapping the frequency band of the acoustic noise reduced by the expansion chamber 100 and the perforated silencer 300. In such an embodiment, one partition or a plurality of partitions may be provided, e.g., installed, in the perforated silencer 440 to increase a frequency band that is subject to acoustic noise reduction.

Figure 8:
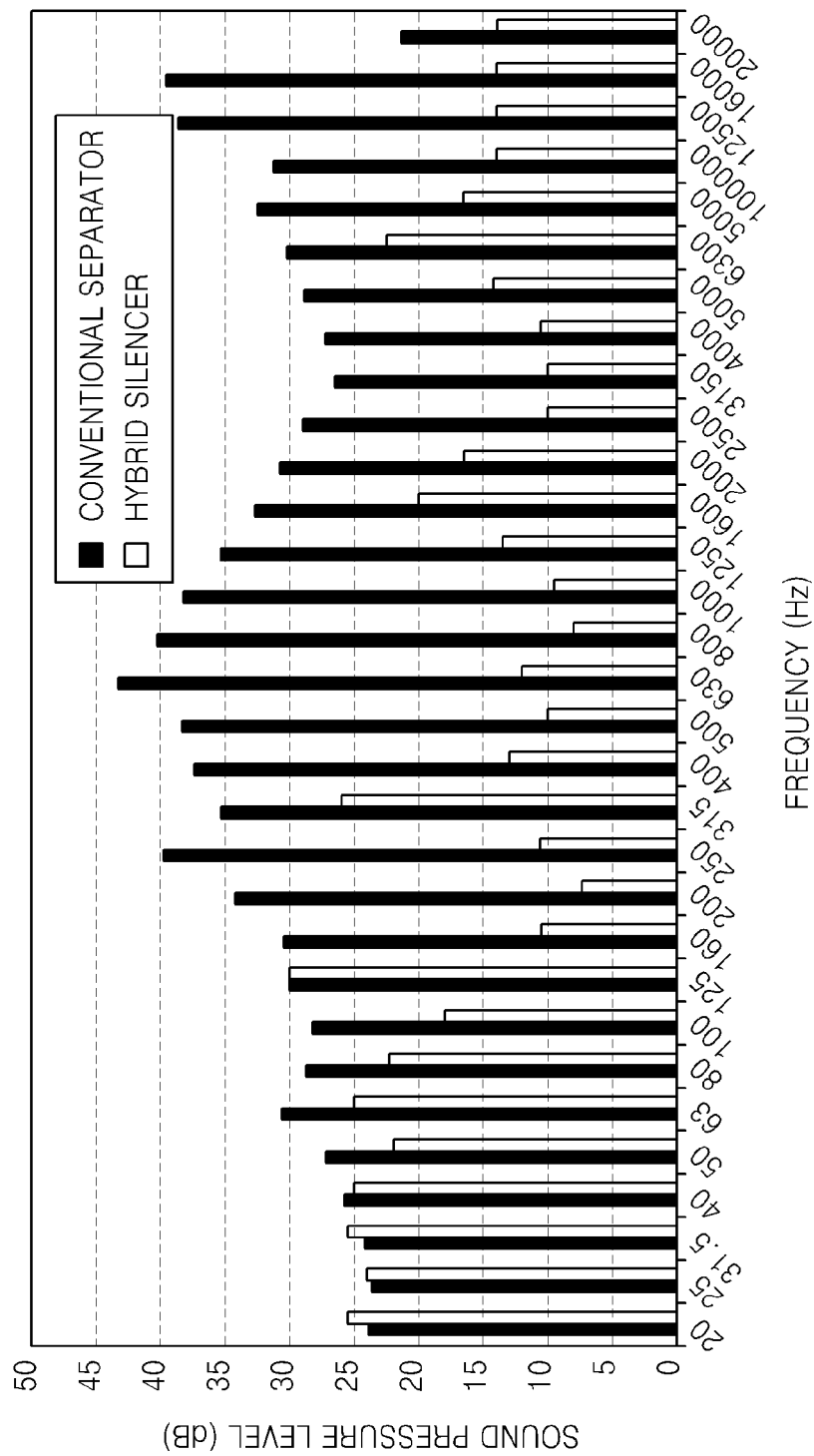
FIG. 8 is a graph showing a result of measuring acoustic noise before and after using an embodiment of the hybrid silencer of FIGS. 3A and 3B.

FIG. 8 is a graph showing a result of measuring acoustic noise before and after using the hybrid silencer 52 of FIGS. 3A and 3B. Acoustic noise of a fuel cell system is measured at a point about 10 m away from the fuel cell system, and sound pressure levels detected in an about ⅓ octave band unit in a frequency band from about 20 Hz to about 20 kHz from the measured acoustic noise are shown in FIG. 8. Referring to FIG. 8, a result corresponding to each frequency in a ⅓ octave band in the frequency band from about 20 Hz to about 20 kHz are shown by a pair of bars. In the pair of bars, a left bar denotes acoustic noise measured when a conventional separator having a gas-liquid separating function is applied to a fuel cell system, and a right bar denotes acoustic noise measured when an embodiment of the hybrid silencer 52 of FIGS. 5A and 5B is applied to a fuel cell system. Referring to FIG. 8, acoustic noise of the fuel cell system is substantially reduced in a frequency band equal to or higher than about 1 kHz by applying the hybrid silencer 52 of FIGS. 5A and 5B to the fuel cell system.

As described above, an embodiment of the hybrid silencer separates and discharges the gas component and the liquid component from the fluid flowing inside the fuel cell system and reduces the acoustic noise of the fluid, and thus a weight and volume of the fuel cell system using the hybrid silencer is substantially decreased compared to a fuel cell system including a conventional separate apparatus for reducing acoustic noise. In an embodiment, the hybrid silencer includes heterogeneous silencers, such as an expansion silencer and a perforated silencer, for example, and thus acoustic noise in a predetermined frequency band generated by the fuel cell system is effectively reduced to a predetermined sound pressure level or therebelow.

In an embodiment, a predetermined acoustic noise condition, for example, an acoustic noise condition of military specifications, may not be substantially completely satisfied by the embodiment of the hybrid silencer 52 of FIGS. 5A and 5B. Referring to FIG. 8, acoustic noise in a frequency band lower than about 100 Hz may not be effectively reduced using the hybrid silencer 52 of FIGS. 5A and 5B. In another embodiment, a silencer for acoustic noise reduction, for example, an embodiment of the silencer of FIGS. 6A and 6B or 7A and 7B, may be further provided in the hybrid silencer 52 of FIGS. 5A and 5B. In an embodiment, acoustic noise generated by self-vibration of the air pump 41 may be effectively prevented by improving an installation method of the air pump 41.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A hybrid silencer in a fuel cell system, the hybrid silencer comprising:
an expansion chamber connected to a predetermined apparatus of the fuel cell system, wherein the expansion chamber reduces acoustic noise of a fluid, which is a blend of a liquid component and a gas component, discharged from the predetermined apparatus;
a water-absorber disposed inside the expansion chamber, wherein the water-absorber absorbs the liquid component of the fluid which flows into the expansion chamber from the predetermined apparatus; and
a perforated silencer which discharges the fluid, from which the liquid component is removed by the water-absorber, while reducing acoustic noise of the fluid discharged therefrom,
wherein the expansion chamber comprises:
an inlet pipe which receives the fluid from the predetermined apparatus; and
an outlet pipe which discharges the liquid component absorbed by the water-absorber,
wherein the water-absorber is in contact with the outlet pipe.

2. The hybrid silencer of claim 1, wherein the perforated silencer comprises:
a cavity defined in an inner space of the hybrid silencer; and
a perforated pipe extending through the cavity.

3. The hybrid silencer of claim 2, wherein the perforated silencer further comprises a plurality of partitions disposed in the cavity,
wherein the partitions divide the cavity into a plurality of sub-cavities.

4. The hybrid silencer of claim 2, wherein
a part of the water-absorber is disposed inside the cavity, and
the liquid component of the fluid discharged from holes of the perforated pipe is absorbed by the part of the water-absorber inside the cavity.

5. The hybrid silencer of claim 2, wherein the hybrid silencer has a shape defined by two boxes having different volumes and combined to each other,
wherein the cavity is in an inner space of a first box of the two boxes having a smaller volume than a second box of the two boxes.

6. The hybrid silencer of claim 5, wherein
a contacting portion of the two combined boxes is opened,
an inlet of the perforated pipe is disposed at the contacting portion, and
the water-absorber has a space, through which the fluid, which is flowed into the inlet pipe of the expansion chamber, flows to the inlet of the perforated pipe such that the fluid, from which the liquid component is removed by the water-absorber, is discharged through the perforated pipe.

7. The hybrid silencer of claim 1, further comprising:
a silencer disposed in the water-absorber,
wherein the silencer reduces acoustic noise of the fluid flowed from the expansion chamber.

8. The hybrid silencer of claim 7, wherein the silencer disposed in the water-absorber reduces acoustic noise of the fluid flowed from the expansion chamber in a frequency band which is different from a frequency band of acoustic noise reduced by the expansion chamber and perforated silencer.

9. The hybrid silencer of claim 7, wherein the silencer disposed in the water-absorber comprises a Helmholtz resonator.

10. The hybrid silencer of claim 1, wherein the water-absorber is selected from the group consisting of a sponge, cotton and paper.

11. A hybrid silencer in a fuel cell system, the hybrid silencer comprising:
   an expansion chamber connected to a predetermined apparatus of the fuel cell system, wherein the expansion chamber reduces acoustic noise of a fluid, which is blend of a liquid component and a gas component, discharged from the predetermined apparatus;
   a water-absorber disposed inside the expansion chamber, wherein the water-absorber absorbs the liquid component of the fluid which flows into the expansion chamber from the predetermined apparatus; and
   a perforated silencer which discharges the fluid, from which the liquid component is removed by the water-absorber, while reducing acoustic noise of the fluid discharged therefrom,
   wherein the expansion chamber comprises:
   an inlet pipe which receives the fluid from the predetermined apparatus; and
   an outlet pipe which discharges the liquid component absorbed by the water-absorber,
   wherein the hybrid silencer has a shape defined by two boxes having different volumes and combined to each other,
   wherein the expansion chamber is in an inner space of a first box of the two boxes having a larger volume than a second box of the two boxes, and
   the inlet pipe is disposed in a space generated due to a size difference between the expansion chamber and the perforated silencer.

12. A fuel cell system comprising:
   a fuel cell which generates power using a fuel;
   a hybrid silencer which separates and discharges a gas component and a liquid component from a fluid flowing inside the fuel cell system, while reducing acoustic noise of the fluid; and
   a balance of plants which mixes and supplies the liquid component discharged from the hybrid silencer, and the fuel, to the fuel cell,
   wherein a water-absorber is disposed inside the hybrid silencer and absorbs the liquid component of the fluid which flows into the hybrid silencer, wherein the water-absorber is in contact with an outlet pipe of the hybrid silencer, the outlet pipe discharges the liquid component absorbed by the water-absorber.

13. The fuel cell system of claim 12, wherein the hybrid silencer separates and discharges the gas component and the liquid component from a fluid discharged from the fuel cell, while reducing acoustic noise of the fluid discharged from the fuel cell.

14. The fuel cell system of claim 12, wherein the balance of plants comprises:
   a heat exchanger which cools down a fluid discharged from an outlet at a cathode of the fuel cell,
   wherein the hybrid silencer separates and discharges a gas component and a liquid component from a fluid discharged from the heat exchanger, while reducing acoustic noise of the fluid discharged from the heat exchanger.

15. The fuel cell system of claim 12, wherein the hybrid silencer comprises:
   an expansion chamber connected to a predetermined apparatus of the fuel cell system, wherein the expansion chamber reduces acoustic noise of a fluid discharged from the predetermined apparatus which flows into the expansion chamber;
   the water-absorber disposed inside the expansion chamber, wherein the water-absorber absorbs a liquid component of the fluid which flows into the expansion chamber; and
   a perforated silencer which discharges the fluid from which the liquid component is removed by the water-absorber, while reducing acoustic noise of the fluid discharged therefrom.

16. The fuel cell system of claim 15, wherein the hybrid silencer has a shape defined by two boxes having different volumes and combined to each other,
   wherein the expansion chamber is in an inner space of a first box of the two boxes having a larger volume that a second box of the two boxes.

* * * * *